(12) United States Patent
Takase

(10) Patent No.: US 7,197,643 B2
(45) Date of Patent: Mar. 27, 2007

(54) KEY EXCHANGE PROXY NETWORK SYSTEM

(75) Inventor: Masaaki Takase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 10/674,362

(22) Filed: Sep. 30, 2003

(65) Prior Publication Data
US 2004/0062399 A1 Apr. 1, 2004

(30) Foreign Application Priority Data
Oct. 1, 2002 (JP) .............................. 2002-288476

(51) Int. Cl.
*G06F 1/24* (2006.01)
(52) U.S. Cl. ....................... 713/171; 713/168; 713/169
(58) Field of Classification Search ................ 713/171, 713/168, 169
See application file for complete search history.

(56) References Cited

FOREIGN PATENT DOCUMENTS

| | | |
|---|---|---|
| EP | 1 089 580 | 4/2001 |
| JP | 2001-169341 | 6/2001 |
| JP | 2002-158650 | 5/2002 |

*Primary Examiner*—Thomas R. Peeso
(74) *Attorney, Agent, or Firm*—Katten Muchin Rosenman LLP

(57) ABSTRACT

If no encryption key necessary for performing encrypted communication to opposite communication terminal 6 exists, subscriber terminal 5 transmits key exchange proxy request message to service control unit 1. The service control unit 1 transfer the key exchange proxy request to key exchange proxy server 2 based on service profile transmitted from authentication server 3. The key exchange proxy server 2 decides key by transmitting/receiving key exchange message to/from the opposite communication terminal 6. A message including the decided key is transmitted to the service control unit 1. The service control unit transfer the message from the key exchange proxy server 2 with the key to the subscriber terminal 5 based on the service profile. Then, encrypted communication between the subscriber terminal 5 and the opposite communication terminal 6 is performed.

29 Claims, 16 Drawing Sheets

FIG. 3

SERVICE PROFILE

| NAME | CONTENT |
|---|---|
| SUBSCRIBER IDENTIFICATION INFORMATION | TELEPHONE NUMBER |
| | NAI |
| | AUTHENTICATION ENTRY NUMBER |
| | ⋮ |
| IPSec APPLICATION CONDITION 1 | IP ADDRESS |
| | PORT NUMBER |
| IPSec APPLICATION CONDITION 2 | IP ADDRESS |
| | PORT NUMBER |
| ⋮ | ⋮ |

DATA RETAINED BY SUBSCRIBER TERMINAL

FIG. 5A

SPD

| NAME | CONTENT |
|---|---|
| IPSec APPLICATION CONDITION 1 | IP ADDRESS |
| | PORT NUMBER |
| IPSec APPLICATION CONDITION 2 | IP ADDRESS |
| | PORT NUMBER |
| ⋮ | ⋮ |

FIG. 5B

SAD

| NAME | APPLICATION CONDITION | CONTENT |
|---|---|---|
| IPSec APPLICATION CONDITION 1 | IP ADDRESS | ENCRYPTION PROTOCOL |
| | | KEY |
| | PORT NUMBER | SPI |
| IPSec APPLICATION CONDITION 2 | IP ADDRESS | ENCRYPTION PROTOCOL |
| | | KEY |
| | PORT NUMBER | SPI |
| ⋮ | ⋮ | ⋮ |

KEY EXCHANGE MESSAGE
(KEY EXCHANGE PROXY REQUEST MESSAGE)

(SUBSCRIBER TERMINAL → SERVICE CONTROL UNIT)

KEY EXCHANGE MESSAGE
(KEY EXCHANGE PROXY REQUEST MESSAGE)

(SERVICE CONTROL UNIT → KEY EXCHANGE PROXY SERVER)

FIG. 13A

KEY EXCHANGE MESSAGE

(SERVICE CONTROL UNIT → OPPOSITE COMMUNICATION TERMINAL)

| IKE MESSAGE<br>SA: SUBSCRIBER TERMINAL<br>DA: OPPOSITE COMMUNICATION TERMINAL |
|---|

FIG. 13B

KEY EXCHANGE MESSAGE

(OPPOSITE COMMUNICATION TERMINAL → SERVICE CONTROL UNIT)

| IKE MESSAGE<br>SA: OPPOSITE COMMUNICATION TERMINAL<br>DA: SUBSCRIBER TERMINAL |
|---|

FIG. 13C

KEY EXCHANGE MESSAGE

(SERVICE CONTROL UNIT → KEY EXCHANGE PROXY SERVER)

| IP HEADER<br>SA: SERVICE CONTROL UNIT<br>DA: KEY EXCHANGE PROXY SERVER | IKE MESSAGE<br>SA: OPPOSITE COMMUNICATION TERMINAL<br>DA: SUBSCRIBER TERMINAL |
|---|---|

FIG. 13D

KEY EXCHANGE MESSAGE

(KEY EXCHANGE PROXY SERVER → SERVICE CONTROL UNIT)

| IP HEADER<br>SA: KEY EXCHANGE PROXY SERVER<br>DA: SERVICE CONTROL UNIT | IKE MESSAGE<br>SA: SUBSCRIBER TERMINAL<br>DA: OPPOSITE COMMUNICATION TERMINAL |
|---|---|

KEY TRANSFER MESSAGE (KEY EXCHANGE PROXY SERVER → SERVICE CONTROL UNIT)

KEY TRANSFER MESSAGE (SERVICE CONTROL UNIT → SUBSCRIBER TERMINAL)

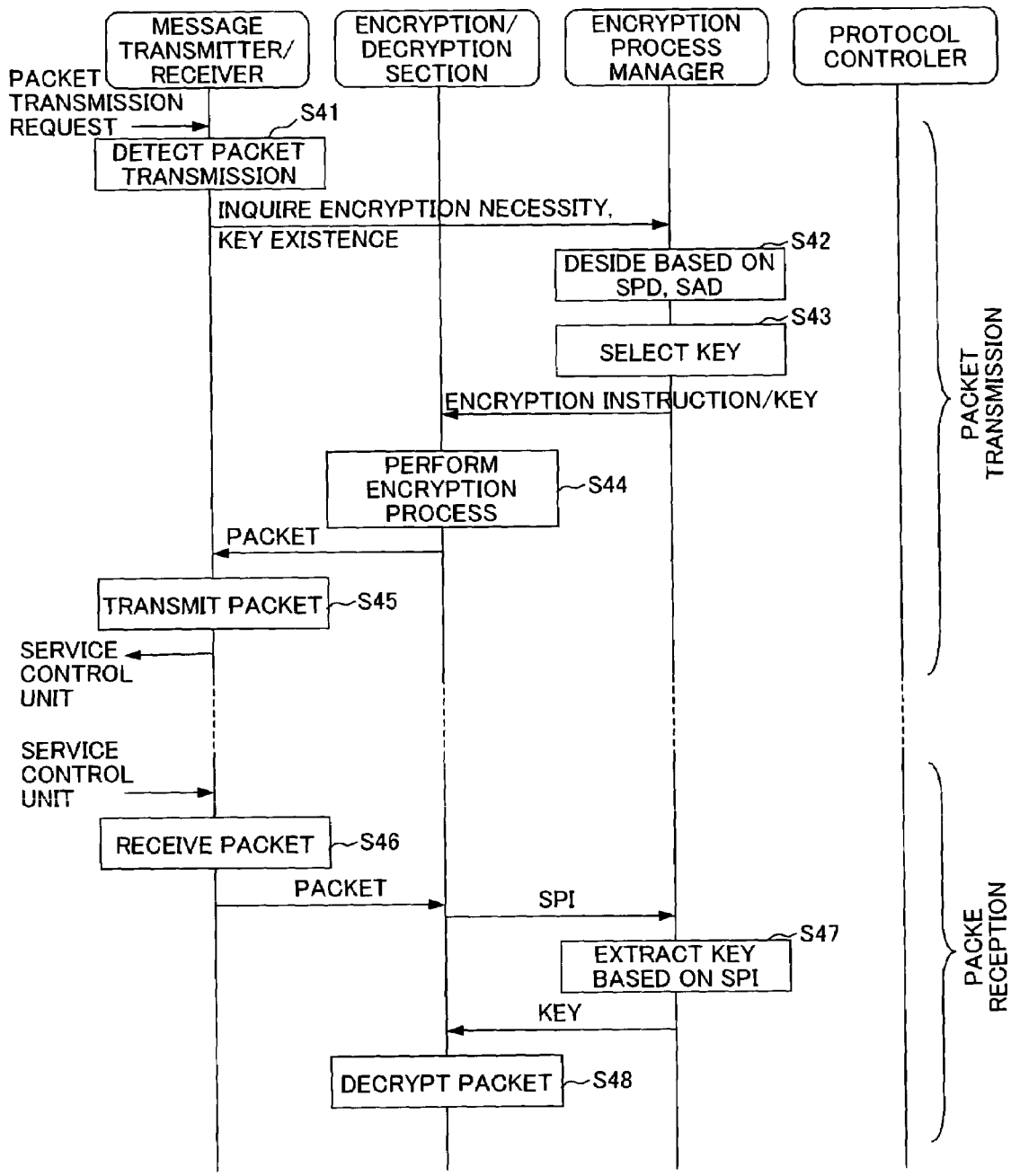

KEY EXCHANGE PROXY NETWORK SYSTEM

FIELD OF THE INVENTION

The present invention relates to a key exchange proxy network system and more particularly a key exchange proxy network system which performs as proxy the key exchange required for the implementation of the IP Sec standard.

Also, the present invention relates to a terminal unit, a service control unit and a key exchange proxy unit in the key exchange proxy network system.

BACKGROUND OF THE INVENTION

IP packet traffic is increasing with the rapid growth of the Internet. Also, penetration of the portable telephone service causes a growing demand to standardize and implement IMT-2000 (International Mobile Telecommunications 2000). With such a background, high-speed IP communication in the mobile environment will become in more widespread use.

The IP communication in the mobile environment requires IPv6 (Internet Protocol version 6) because there is a problem of possible exhaustion of IP addresses in the conventional IPv4. In the IPv6 environment, it is mandatory that IP Sec/IKE (IP security/Internet Key Exchange) be employed in terminal units including servers. By employing IP Sec, secure communication service may be obtained.

However, according to IP Sec/IKE, it is necessary to install a key exchange server (IKE server) in the terminals. This requires the terminal to have a relatively high speed processing unit (CPU, etc.) as well as a large capacity memory, because complicated processing is needed in such a key exchange server.

For this reason, though it is easy to introduce IP Sec/IKE in the terminal such as a personal computer and a server, there may be a problem to implement IP Sec/IKE in portable terminal devices such as a portable telephone and a portable digital assistant (PDA), in which miniaturized and light structure is demanded.

There has been devised a Diffie-Hellman method to enable a key exchange function in an ordinary communication path in which secure communication is not guaranteed. However, in order to incorporate this method, calculation of a power has to be done in each terminal requiring key exchange. This consumes a lot of resources in the terminal, and imposes substantially large load on such a portable terminal device.

Moreover, considerably large electric power is consumed in performing the IPSec/IKE processing. Therefore, it is not a practical solution to install IP Sec/IKE in the portable terminal device also from the viewpoint of power consumption. Accordingly, it has been needed to incorporate a service based on IP Sec/IKE with minimized functional addition into such a portable terminal device.

For the above-mentioned reason, there has been devised a key exchange processing technique to be performed in other equipment than a portable terminal device, functioning as proxy for the portable terminal device. A technique has been disclosed by use of a home server accessed by a user terminal device, performing as proxy for the terminal device. (For example, refer to the following patent document 1.)

Patent Document 1

Official gazette of the Japanese Unexamined Patent Publication Number 2002-158650 (FIG. 1, etc.) However, according to this prior art, because a user terminal device directly accesses a proxy server such as home server, it is required for the user terminal device to recognize the address of the proxy server. Here, the terminal device on the opposite party communicating with this user terminal device does not always recognize the proxy server address. Accordingly, the terminal device on the opposite party cannot initiate communication to perform key exchange. Use of this prior art is restricted to the case of initiating communication from the user terminal device. The present invention has been invented in view of the above-mentioned background.

SUMMARY OF THE INVENTION

It is an object of the present invention to provide a processing related to the key exchange to be performed on the network side, as proxy for the terminal side, so as to reduce a load of the terminal device side.

It is another object of the present invention to provide a key exchange proxy method enabling the key exchange processing in case whichever of the two terminal devices may initiate a key exchange processing request for encryption communication.

In order to achieve the aforementioned object, according to the present invention, a key exchange proxy network system performs, as proxy, a key exchange processing to be performed between a first terminal unit and a second terminal unit for encryption communication therebetween. The key exchange proxy network system includes a first service control unit accessed by the first terminal unit, and a first key exchange proxy unit performing the key exchange processing as proxy for the first terminal unit. The first service control unit includes; a first message reception section receiving a message from the first terminal unit or the second terminal unit, or the first key exchange proxy unit; a first protocol control section which-retains a first data for deciding whether a message received by the first message reception section is a key exchange message or a message including a key, decides whether the reception message is the key exchange message or the message including the key based on the first data, determines the first key exchange proxy unit as transfer address when the reception message is a key exchange message received from either the first terminal unit or the second terminal unit, determines the second terminal unit as transfer address when the reception message is a key exchange message received from the first key exchange proxy unit, and determines the first terminal unit as transfer address when the reception message is a message including the key; and a first message transmission section transmitting the message received by the first message reception section to the transfer address determined by the first protocol control section. Further, the first key exchange proxy unit includes a second message reception section receiving a message from the first service control unit; a second protocol control section which exchanges the key exchange messages with the second terminal unit, and determines a key, when the message received by the second message reception section is the key exchange message; and a second message transmission section transmitting the key determined by the second protocol control section to the first service control unit as message including the key.

According to the present invention, the key exchange proxy network system includes a key exchange proxy unit performing, as proxy for the terminal unit, a key exchange processing against the opposite terminal unit to perform encryption communication between the terminal units. The key exchange proxy unit includes; a message reception section accessed by the terminal unit, and receiving the message from service control unit transferring the message received from either the terminal unit or the opposite terminal unit; a protocol control section which exchanges key exchange messages with the opposite terminal unit, and determines the key, when the message received by the message reception section is the key exchange message; and a message transmission section which transmits the key determined by the protocol control section to the service control unit as message including the key.

According to the present invention, there is provided a key exchange proxy method applicable for a key exchange proxy network system having a key exchange proxy unit. Here, the key exchange proxy unit performs, as proxy for a first terminal unit, a key exchange processing to be performed between the first terminal unit and a second terminal unit for encryption communication. The key exchange proxy method includes; in the service control unit, transferring a key exchange message transmitted from either the first terminal unit or the second terminal unit to the key exchange proxy unit; in the key exchange proxy unit, generating the key exchange message to be exchanged between the first terminal unit and the second terminal unit, and transmitting the generated key exchange message to the service control unit; in the service control unit, transferring the key exchange message to the second terminal unit; in the key exchange proxy unit, transmitting a message including the key determined by exchanging the key exchange messages to the service control unit; and in the service control unit, transferring to the first terminal unit the message including the key received from the key exchange proxy unit.

According to the present invention, the key exchange message transmitted from either the first terminal unit or the second terminal unit to the service control unit is transferred to the key exchange proxy unit by the service control unit. Thereafter, the key exchange processing is performed between the key exchange proxy unit and the second terminal unit, and a key necessary for the encryption communication is determined. The determined key is transmitted to the first terminal unit.

Thus, according to the present invention, the first terminal unit can obtain the key necessary for the encryption communication without performing necessary processing for the key exchange and the key determination. As a result, it becomes possible to reduce the load of the first terminal unit.

Further, the service control unit transfers the key exchange message received from either the first terminal unit or the second terminal unit to the key exchange proxy unit. Therefore, it is merely necessary for the first terminal unit to recognize the destination address of the second terminal unit. Also, it is merely necessary for the second terminal unit to recognize the destination address of the first terminal unit. Accordingly, the proxy for the key exchange processing can be achieved upon a key exchange request from whichever terminals, either the first terminal unit or the second terminal unit.

According to the present invention, there is provided a service control unit which is accessed by a terminal unit and transfers a message from any one of the terminal unit, a key exchange proxy unit performing a key exchange processing as proxy for the terminal unit, and the opposite terminal unit performing encryption communication with the terminal unit. The service control unit includes; a message reception section receiving a message from the terminal unit, the key exchange proxy unit, or the opposite terminal unit; a protocol control section which retains a data for deciding whether a message received by the message reception section is a key exchange message or a message including a key, decides whether the reception message is the key exchange message or the message including the key based on the data, determines the key exchange proxy unit as transfer address when the reception message is a key exchange message received from either the terminal unit or the opposite terminal unit, determines the opposite terminal unit as transfer address when the reception message is a key exchange message received from the key exchange proxy unit, and determines the terminal unit as transfer address when the reception message is a message including the key; and a message transmission section transmitting the reception message to the transfer address determined by the protocol control section.

According to the present invention, the key exchange proxy unit performing, as proxy for the terminal unit, a key exchange processing against the opposite terminal unit to perform encryption communication between the terminal units. The key exchange proxy unit includes; a message reception section which is accessed by the terminal unit and receives the message from service control unit transferring the message received from either the terminal unit or the opposite terminal unit; a protocol control section which exchanges key exchange messages with the opposite terminal unit, and determines the key, when the message received by the message reception section is the key exchange message; and a message transmission section which transmits the key determined by the protocol control section to the service control unit as message including the key.

According to the present invention, the terminal unit accesses a service control unit in a communication network, and performs encryption communication with the opposite terminal unit. The terminal unit includes; an encryption process management section which retains a first data specifying a condition of communication requiring encryption and a second data including a key for use in the encryption, decides whether encryption is required for the communication with the opposite terminal unit based on the first data, and decides whether the key required for the encryption is existent in the second data; a message transmission section which transmits a key exchange message to the opposite terminal unit through the service control unit, when the encryption process management section decides that the encryption is required and that the key required for the encryption is not existent; and a message transmission section which receives the message including the key determined between the key exchange proxy unit in the communication network and the opposite terminal unit from the service control unit.

Further scopes and features of the present invention will become more apparent by the following description of the embodiments with the accompanied drawings.

BRIEF DESCRIPTION OF THE DRAWINGS

FIG. 3 shows an example of a service profile.

FIG. 5A shows an SPD (Security Policy Database) retained in an encryption process manager of a subscriber terminal.

FIG. 5B shows an SAD (Security Association Database) retained in an encryption process manager of a subscriber terminal.

FIG. 13A shows a key exchange message transmitted from a service control unit to a terminal on the opposite party.

FIG. 13B shows a key exchange message transmitted from a terminal on the opposite party to a service control unit.

FIG. 13C shows a key exchange message transmitted from a service control unit to a key exchange proxy server.

FIG. 13D shows a key exchange message transmitted from a key exchange proxy server to a service control unit.

FIG. 15 shows a sequence diagram illustrating a packet transmission/reception processing flow in subscriber terminal 5 after the key is determined.

DETAILED DESCRIPTION OF THE PREFERRED EMBODIMENT

The preferred embodiment of the present invention is described hereinafter referring to the charts and drawings.

Figure 1:
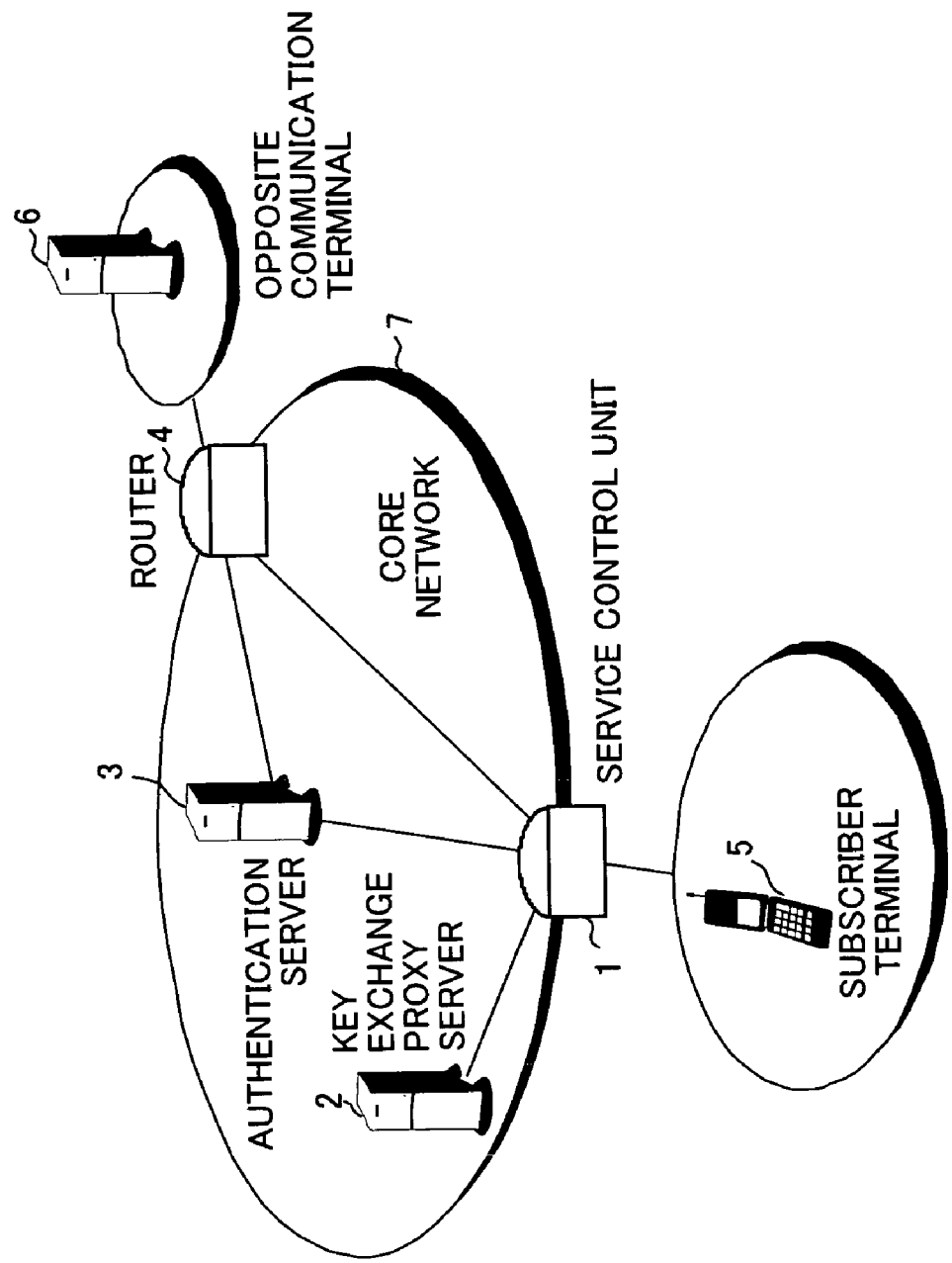
FIG. 1 shows a block diagram illustrating a configuration of a key exchange proxy network system according to an embodiment of the present invention.

FIG. 1 shows a configuration block diagram of a key exchange proxy network system according to the embodiment of the present invention. This key exchange proxy network system includes service control unit 1, key exchange proxy server 2, authentication server 3, router 4, subscriber terminal 5, and a communication terminal 6 (hereafter referred to as the opposite communication terminal 6) located on the opposite party for communication with subscriber terminal 5.

Service control unit 1, key exchange proxy server 2, authentication server 3 and router 4 are connected to a core network (for example, the Internet or the carrier's network) 7 which enables communication between the unit, the servers and the router.

As an example, service control unit 1 is an edge router (or edge node) in core network 7, in which service control unit 1 acts as a node performing wireless communication with portable terminal devices (such as subscriber terminal 5) in the mobile IP or the mobile IPv6 environment.

Service control unit 1 recognizes the IP address of key exchange proxy server 2 in advance, and also retains a service profile (described later) supplied from authentication server 3 when subscriber terminal 5 registers the location thereof.

By use of this service profile, service control unit 1 distinguishes between a packet for transmission in a key exchange process and a packet for transmission in an ordinary routing process. The packet (key exchange message, message including a key, etc., described later) for transmission in the key exchange process is transferred to key exchange proxy server 2 or subscriber terminal 5.

Subscriber terminal 5 is, for example, a portable terminal device (portable telephone, PDA, etc.), which is connected to service control unit 1 through a wireless channel. Accordingly, both a packet transmitted from subscriber terminal 5 and a packet transmitted to subscriber terminal 5 pass through service control unit 1. In addition, according to the embodiment of the present invention, subscriber terminal 5 does not mount a key exchange server (IKE server and key exchange program), so as to configure a small-sized, light device with reduced power consumption.

The opposite communication terminal 6 is connected to router 4, and communicates with subscriber terminal 5 through core network 7, according to the embodiment of the present invention. By way of example, the opposite communication terminal 6 is a computer, a server (for example, server for electronic commerce), or the like. A key exchange server (IKE server and key exchange program) is mounted on the opposite communication terminal 6.

Because subscriber terminal 5 has no key exchange server, key exchange proxy server 2 performs the key exchange processing between the opposite communication terminal 6 and key exchange proxy server 2 based on the IP Sec/IKE (IP Security/Internet Key Exchange), as proxy for subscriber terminal 5. The encryption key (common key, secret key, etc.) determined in the above-mentioned processing is supplied to subscriber terminal 5.

Authentication server 3 also functions as a service management server in accordance with this embodiment of the present invention. Authentication server 3 retains a service profile (original), which will be explained later in detail, in addition to an authentication data for subscriber terminal 5, etc. On authenticating subscriber terminal 5 at the time of connecting subscriber terminal 5 to the network, authentication server 3 transmits a service profile (copy) to service control unit 1.

Here, the service profile may otherwise be stored in a non-illustrated database cooperating with authentication server 3. Also, authentication server 3 and the service management server may possibly be implemented separately. In case of separate implementation of these servers, the service profile is transferred from the service management server to service control unit 1.

For the sake of easy understanding, a single service control unit 1 is shown in FIG. 1, despite a plurality of service control units are provided in core network 7. As subscriber terminal 5 moves, subscriber terminal 5 establishes a wireless connection to a service control unit located nearest to subscriber terminal 5 at that time.

Further, a plurality of key exchange proxy servers may also be implemented in core network 7. In the case of a plurality of service control units and a plurality of key exchange proxy servers, each service control unit is informed of the IP address of the key exchange proxy server located nearest to the service control unit, and the key exchange proxy server located nearest to the service control-unit performs the key exchange processing as proxy for subscriber terminal 5.

Figure 2:
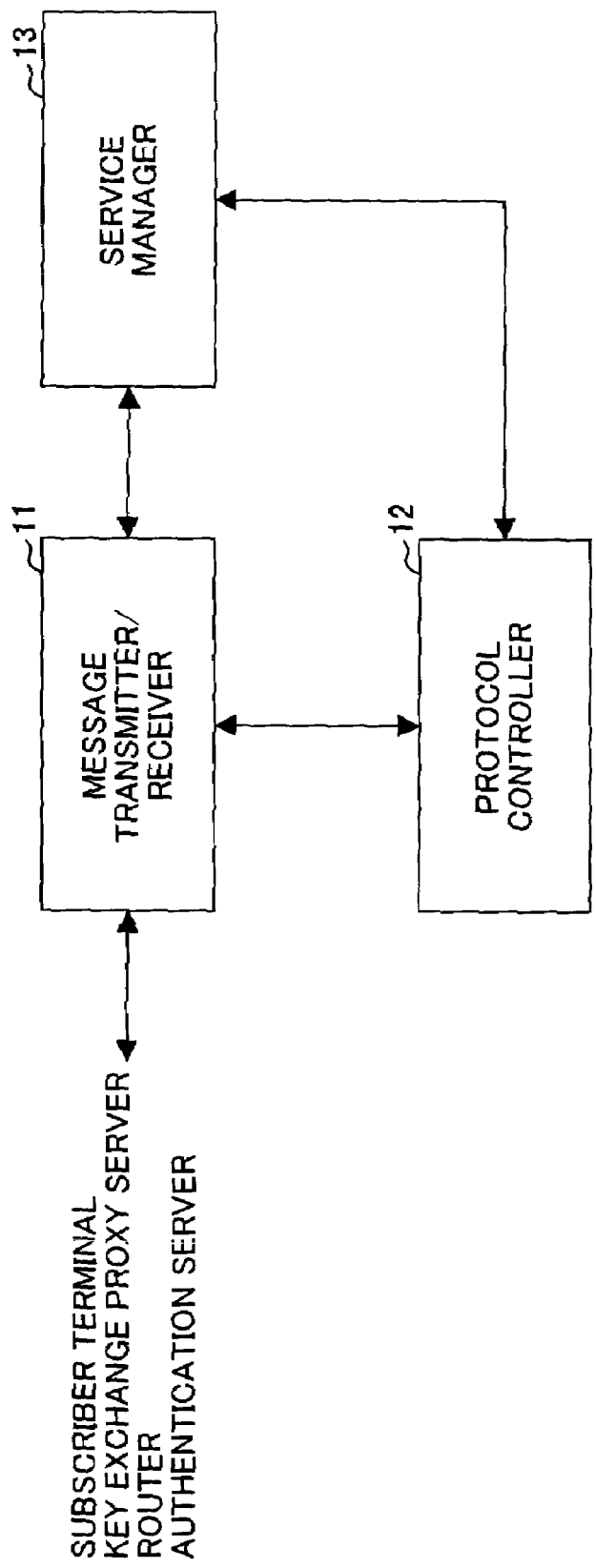
FIG. 2 shows a block diagram illustrating a configuration of a service control unit.

FIG. 2 shows a configuration block diagram of service control unit 1. Service control unit 1 is comprised of message transmitter/receiver 11, protocol controller 12 and service manager 13.

Message transmitter/receiver 11 is connected to core network 7. Through this core network 7, message transmitter/receiver 11 receives a packet (hereinafter also referred to as message) from subscriber terminal 5, key exchange proxy server 2, authentication server 3, router 4, etc., and transmits the packet to the terminal, the servers and the router, etc.

Protocol controller 12 receives the message received in message transmitter/receiver 11 and analyzes the received message. As a result of this message analysis, protocol controller 12 determines whether or not the message is to be transferred, and also where the message is to be addressed when the transfer is determined necessary.

Further, protocol controller 12 encapsulates the message when necessary.

In order to determine whether the message is to be transferred, protocol controller 12 retains a service profile supplied from authentication server 3. FIG. 3 shows an example of the service profile.

Such a service profile is generated according to the contract between the network operator and each subscriber, and is provided for each subscriber terminal (subscriber). The service profile for each subscriber includes subscriber identification information and one or more IP Sec application conditions.

The subscriber identification information is provided for identifying each subscriber (subscriber terminal), which includes data items such as telephone number, NAI (Network Access ID), authentication database entry number, etc.

The IP Sec application conditions include the following data specifying; (1) a message transfer condition to be transferred to key exchange proxy server 2 among the messages transmitted from the opposite communication terminal 6 and addressed to subscriber terminal 5; (2) a message transfer condition to be transferred to key exchange proxy server 2 among the messages transmitted from subscriber terminal 5 to the opposite communication terminal 6; and, (3) a message transfer condition to be transferred to either subscriber terminal 5 or the opposite communication terminal 6 among the messages addressed to service control unit 1.

Each of these application conditions includes an IP address and a port number. 'IP address' denotes either the destination IP address or the source IP address included in the message for transfer specified in the above conditions (1) to (3). 'Port number' denotes a number designating the application in TCP (Transmission Control Program) or UDP (User Datagram Protocol). For example, '500' is assigned as a port number for a key exchange message (IKE message) described later.

Service control unit 1 decides whether either the destination IP address or the source IP address included in a received message coincides with the IP address specified in any IP Sec application conditions, and whether the port number included in the received message coincides with the port number specified in any IP Sec application conditions. In case of coincidence, the message is transferred to key exchange proxy server 2, or subscriber terminal 5 or the opposite communication terminal 6, depending on the message content.

According to the embodiment of the present invention, as described later, messages to be transferred include; (1) a key exchange message (key exchange proxy request message) transmitted from subscriber terminal 5 and addressed to the opposite communication terminal 6. (Transfer destination: key exchange proxy server 2); (2) a key exchange message transmitted from the opposite communication terminal 6 and addressed to subscriber terminal 5. (Transfer destination: key exchange proxy server 2); (3) a key exchange message transmitted from key exchange proxy server 2 and addressed to service control unit 1. (Transfer destination: the opposite communication terminal 6); and (4) a message including key information (SA data, or Security Association data) transmitted from key exchange proxy server 2 and addressed to service control unit 1. (Transfer destination: subscriber terminal 5.)

Additionally, there may be cases that 'IP address' in the IP Sec application conditions represents a pair of IP addresses, including subscriber terminal 5 and the opposite terminal communicating with subscriber terminal 5 (such as the opposite communication terminal 6).

A service profile is transmitted in advance from authentication server 3 (namely service management server) to service control unit 1 when subscriber terminal 5 registers location thereof and is authenticated by authentication server 3. The transmitted service profile is retained in service control unit 1. Accordingly, when subscriber terminal 5 moves and service control unit 1 to be accessed is changed, the service profile is transmitted from authentication server 3 to service control unit 1 which is newly accessed by subscriber terminal 5.

Referring back to FIG. 2, service manager 13 receives an analysis result obtained by protocol manager 12, and manages services related to the processing performed against the message, and the like.

Figure 4:
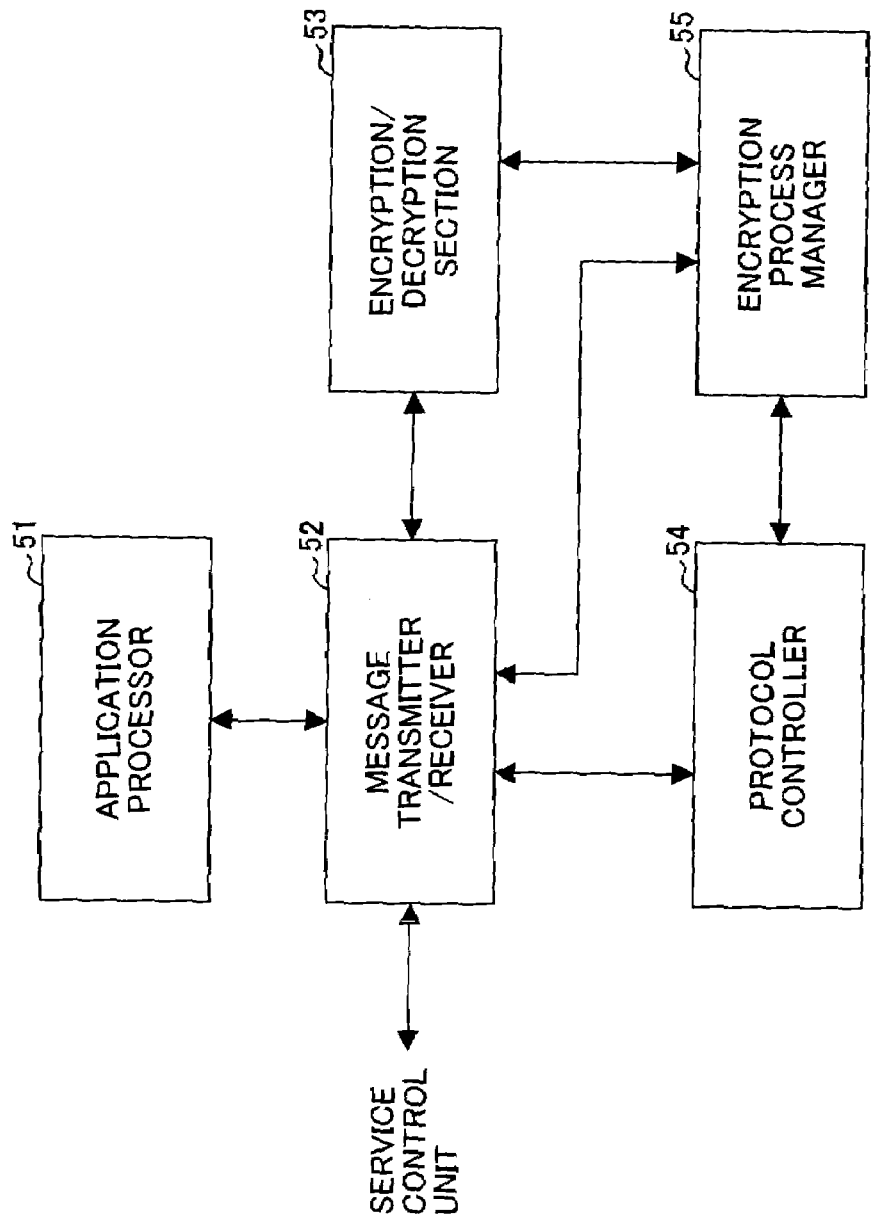
FIG. 4 shows a block diagram illustrating a configuration of a subscriber terminal.

FIG. 4 is a configuration block diagram of subscriber terminal 5. Subscriber terminal 5 has application processor 51, message transmitter/receiver 52, encryption/decryption section 53, protocol controller 54, and encryption process manager 55.

Application processor 51 executes application programs such as browser and mailer, as well as interface processing with the user. Based on an input from the user, application processor 51 issues a message transmission request to message transmitter/receiver 52. Message transmitter/receiver 52 also outputs the data included in the message received by message transmitter/receiver 52, to the display unit for display.

Message transmitter/receiver 52 is connected to core network 7. Through this core network 7, message transmitter/receiver 52 receives and transmits messages from/to service control unit 1.

Encryption/decryption section 53 encrypts a message for transmission, and decrypts a received message. Protocol controller 54 generates a key exchange message (key exchange proxy request message) when the key necessary for communication with the opposite communication terminal 6 is not existent. Further, on receipt of a message (key message) which includes an SA (Security Association) data from key exchange proxy server 2, protocol controller 54 extracts the SA data from the received message.

Encryption process manager 55 retains both a security policy database (SPD) and a security association database (SAD). Based on these data, encryption process manager 55 decides whether or not encryption is necessary for communication with the opposite communication terminal 6, and whether or not a key is already existent.

FIG. 5A shows an SPD retained in encryption process manager 55 of subscriber terminal 5. Also, FIG. 5B shows an SAD retained in encryption process manager 55 of subscriber terminal 5.

The SPD includes one or more IP Sec application conditions for applying encryption communication conforming to IP Sec to subscriber terminal 5. The content of each application condition includes an IP address and a port number, similar to the aforementioned service profile (refer to FIG. 3). 'IP address' is the IP address of the terminal on the opposite communication party requiring encryption communication, and 'port number' is the port number requiring encryption communication (the number which designates an application in TCP or UDP).

When subscriber terminal 5 transmits a packet of which IP address coincides, and port number coincides as well, encryption communication conforming to IP Sec/IKE is applied to the packet.

The SAD includes one or more security association (SA) data. Each SA data includes an application condition and content. 'Application condition' includes IP address and port number similar to the application condition of the SPD. 'Content' includes data items with regard to encryption method for use in the encryption communication (i.e. encryption protocol, such as DES), key (encryption key) for use in the encryption, and security parameter index (SPI). 'SPI' is added to the encrypted message, so that the reception side can identify the encryption protocol and the key to decrypt the received message.

Encryption process manager 55 in subscriber terminal 5 decides whether there exists in the SAD the SA data having the IP address and port number which are respectively coincident with the IP address and the port number stored in the SPD. When the coincident SA data is existent, the message is encrypted using the encryption protocol and the encryption key concerned, and the message is transmitted. On the other hand, when the SA data is not existent, encryption process manager 55 notifies protocol controller 54 of this situation.

Figure 6:
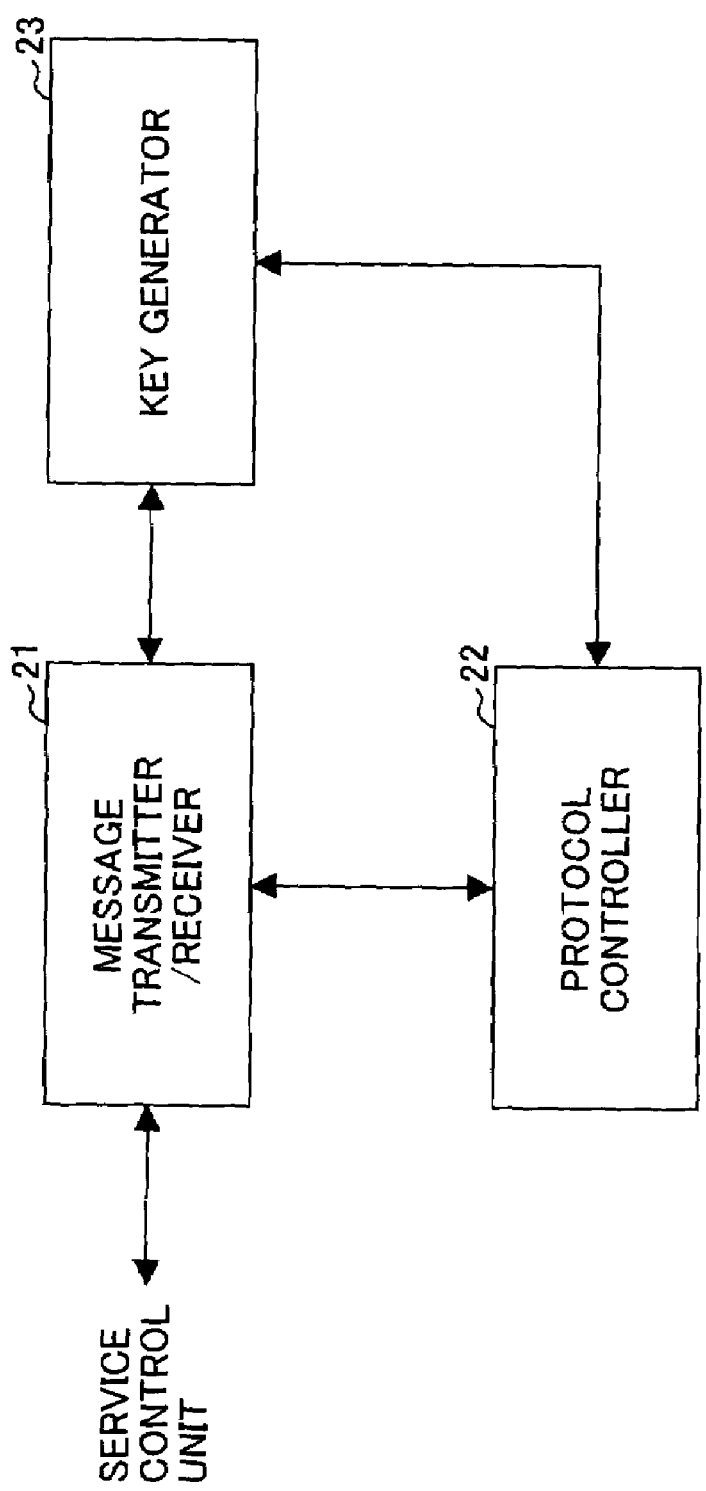
FIG. 6 shows a block diagram illustrating a configuration of a key exchange proxy network server.

FIG. 6 shows a configuration block diagram of key exchange proxy server 2. Key exchange proxy server 2 has message transmitter/receiver 21, protocol controller 22, and key generator 23.

Message transmitter/receiver 21 is connected to core network 7. Through this core network 7, message transmitter/receiver 21 receives or transmits a message from/to service control unit 1.

Protocol controller 22 analyzes a message received in message transmitter/receiver 21, performs the key exchange processing (key exchange process) with the opposite communication terminal 6, and supplies the determined key to message transmitter/receiver 21.

Through the key exchange process performed in protocol controller 22, key generator 23 generates a key in response to the request from protocol controller 22. In this key generation, for example, calculation of a power is performed.

Next, a flow of key exchange proxy processing in this key exchange proxy network system is described hereafter.

Figure 7:
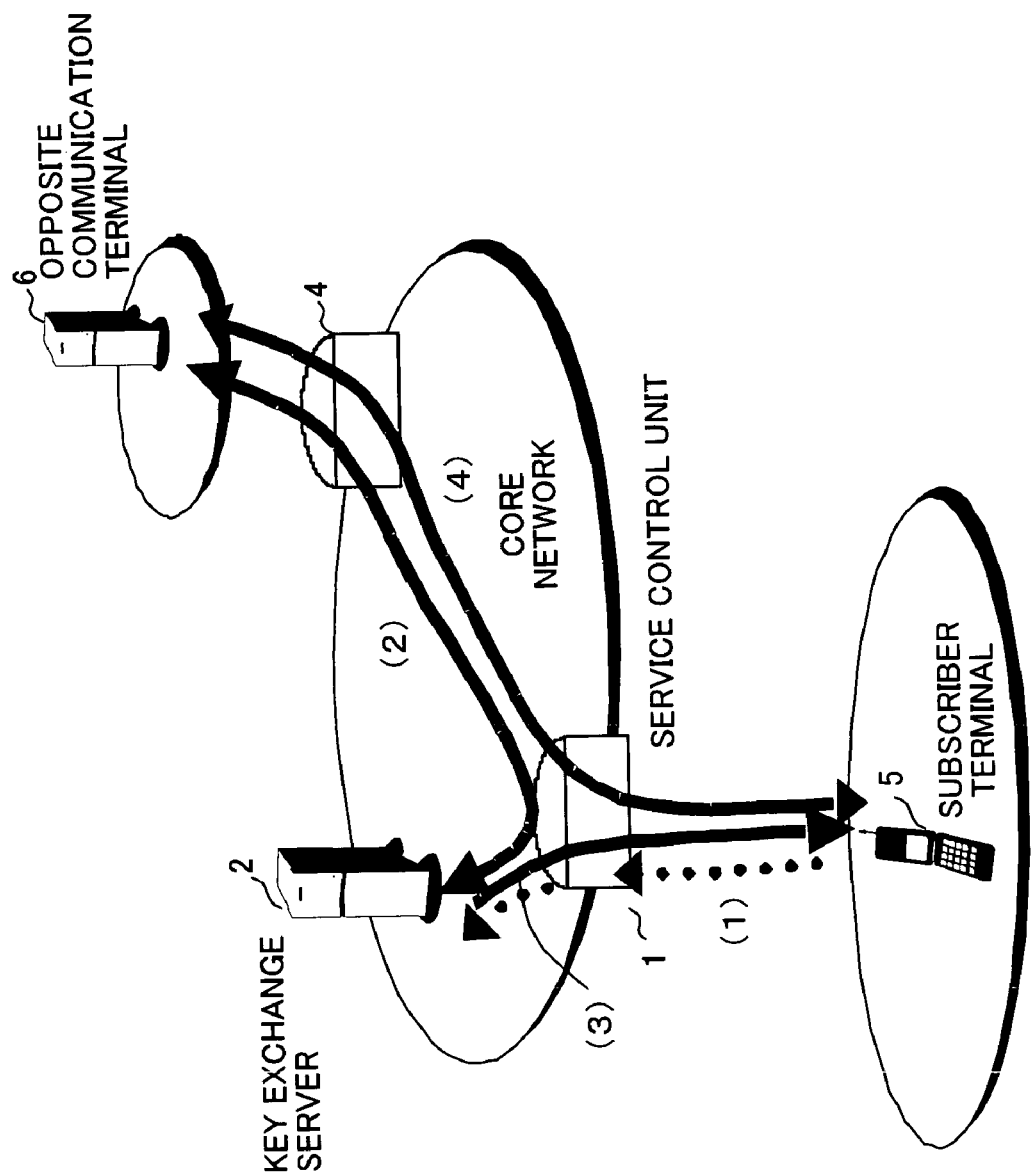
FIG. 7 shows total message flow from the transmission of a key exchange proxy request message issued by a subscriber terminal to encryption communication between the subscriber terminal and a terminal on the opposite party.
Figure 8:
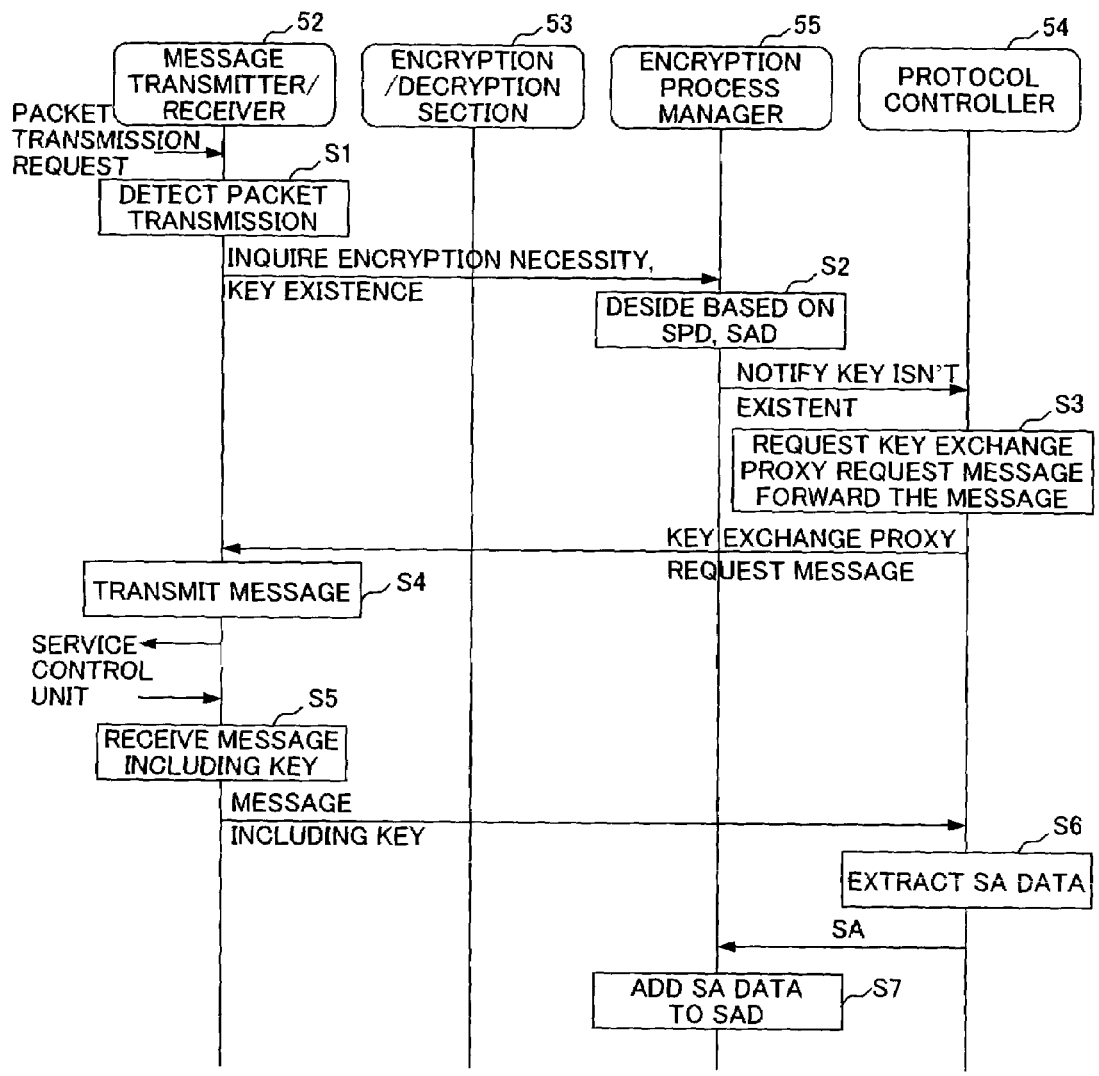
FIG. 8 shows a sequence diagram illustrating a detailed flow of a subscriber terminal.
Figure 9:
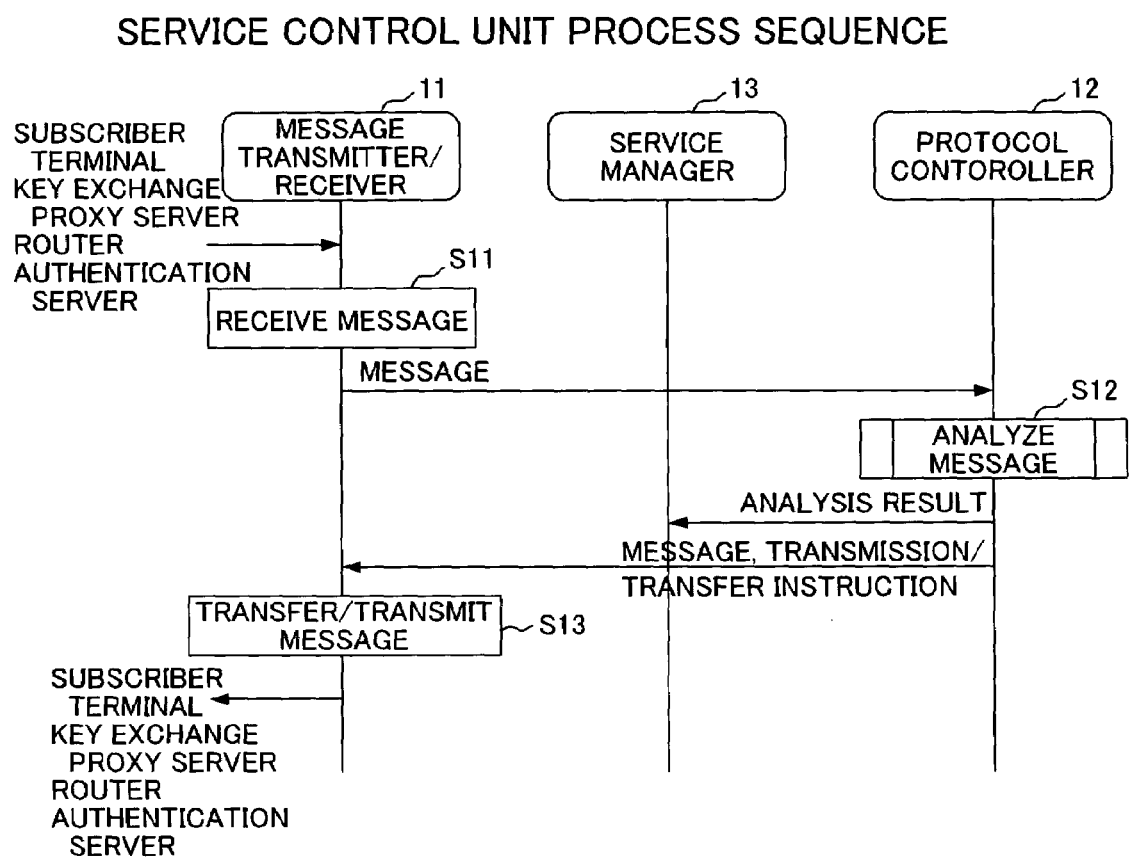
FIG. 9 shows a sequence diagram illustrating a detailed processing flow of a service control unit.
Figure 10:
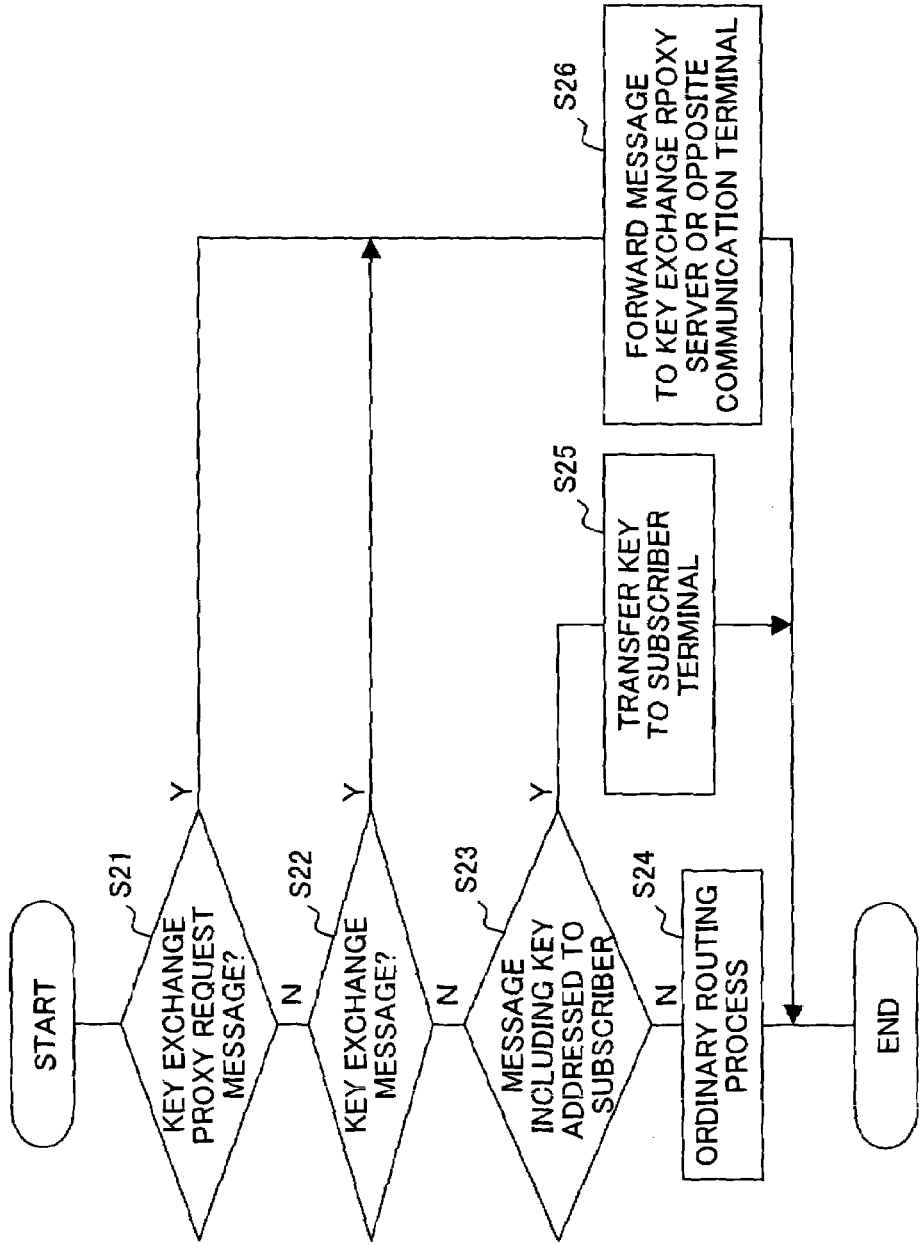
FIG. 10 shows a flowchart illustrating a detailed processing flow of the step S12 shown in FIG. 9.
Figure 11:
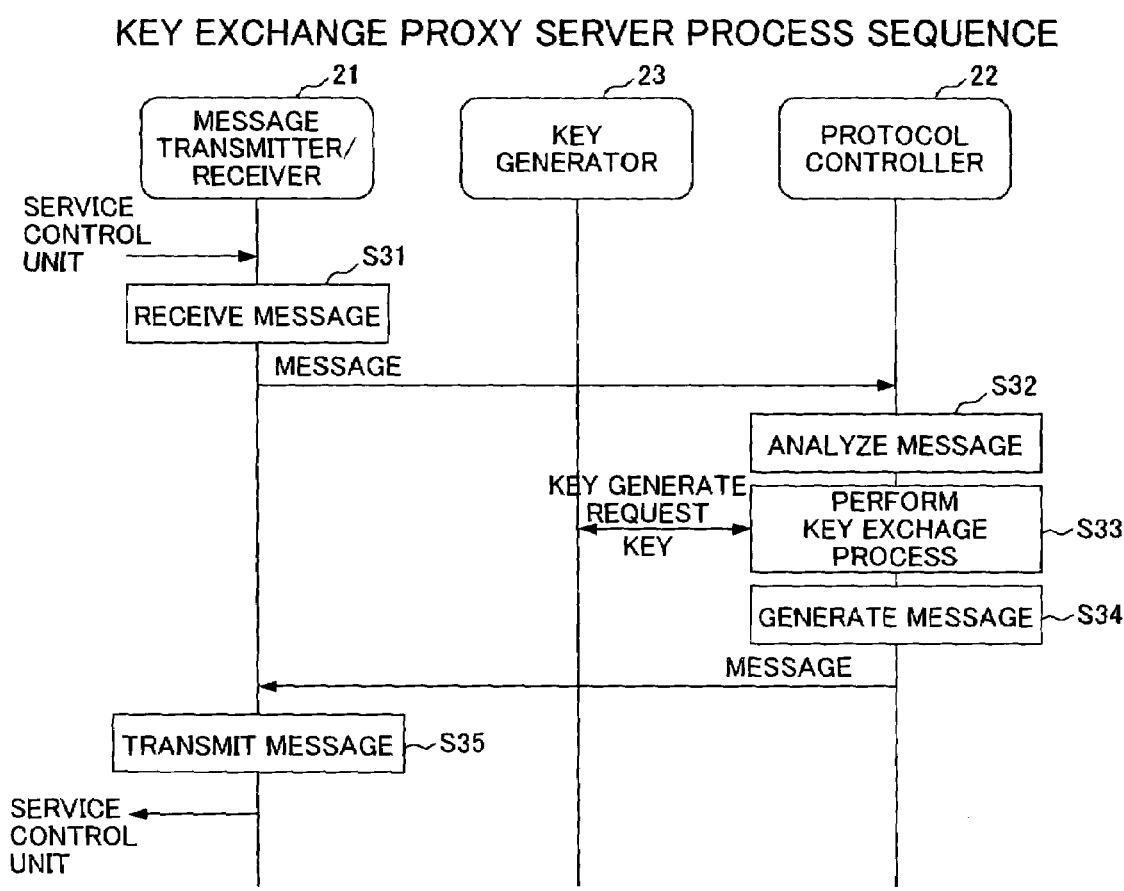
FIG. 11 shows a sequence diagram illustrating a detailed processing flow of a key exchange proxy server.

FIG. 7 shows a total message flow from the transmission of a key exchange message (key exchange proxy request message) by subscriber terminal 5 to the execution of the encryption communication between subscriber terminal 5 and the opposite communication terminal 6. FIG. 8 is a sequence diagram illustrating a detailed processing flow in subscriber terminal 5. FIG. 9 is a sequence diagram illustrating a detailed processing flow in service control unit 1. FIG. 10 is a flowchart illustrating a detailed processing of the step S12 shown in FIG. 9. Also, FIG. 11 is a sequence diagram of a detailed processing flow in key exchange proxy server 2.

First, referring to FIG. 8, message transmitter/receiver 52 in subscriber terminal 5 detects packet transmission by detecting a request for packet transmission (message transmission) transmitted from application processor 51 (not shown in FIG. 8), which is addressed to the opposite communication-terminal 6 (S1). On detection of the packet transmission, message transmitter/receiver 52 inquires encryption process manager 55 about whether or not encryption of the packet is necessary, and also whether or not a key (encryption key) is existent.

In response to the inquiry from message transmitter/receiver 52, encryption process manager 55 decides whether an IP Sec application condition including the IP address (destination address) and the port number respectively coincident with the IP address and the port number included in the transmission packet are found in the SPD. If the coincident IP Sec application condition is found in the SPD, encryption process manager 55 decides that the encryption of the transmission packet is requested, and whether the SA data coincident with the IP address and the port number are respectively existent in the SAD. Meanwhile, if any coincident IP Sec application condition is not found in the SPD, encryption process manager 55 does not perform the above-mentioned processing. Instead, encryption process manager 55 transmits the transmission packet to the destination address, that is, the opposite communication terminal 6, according to the ordinary IP protocol processing.

At the time encryption is decided necessary, if no coincident SA data is existent in the SAD, encryption process manager 55 notifies protocol controller 54 about nonexistence of the key. On receipt of this notification, protocol controller 54 generates a key exchange message (key exchange proxy request message) and forwards this message to message transmitter/receiver 52.

Message transmitter/receiver 52 then transmits the received key exchange message to service control unit 1. (The destination of the message is the opposite communication terminal 6.) The transmission of this key exchange message is shown by a dotted arrow with symbol (1) in FIG. 7.

In addition, the processing to be performed when the encryption is decided necessary, and when a coincident SA data is existent in the SAD as well, will be discussed later referring to FIG. 15.

Figure 12A:
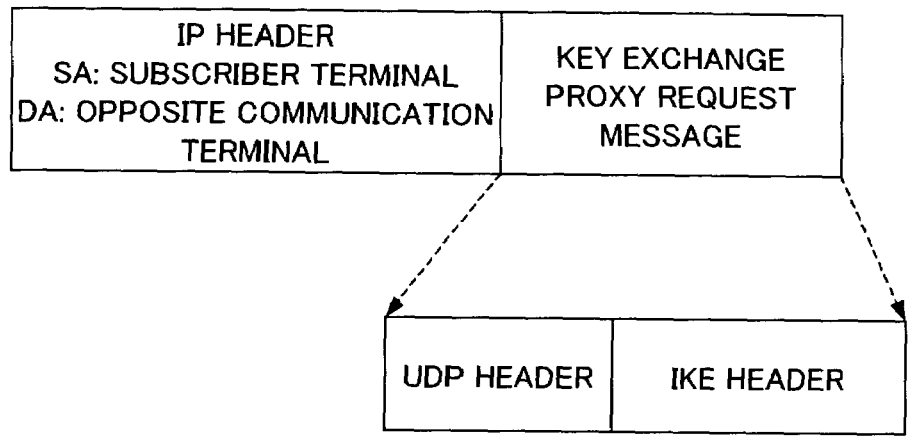
FIG. 12A shows a structure of a key exchange proxy request message transmitted from a subscriber terminal to a service control unit.

FIG. 12A shows a structure of the key exchange message (key exchange proxy request message) transmitted from subscriber terminal 5 to service control unit 1. This key exchange message includes an IP header (header part) and a data part.

The IP header includes the IP address of subscriber terminal 5 as the source address SA, and the IP address of the opposite communication terminal 6 as the destination address DA. Namely, subscriber terminal 5 recognizes that communication is to be performed with the opposite communication terminal 6.

The data part includes a UDP (User Datagram Protocol) header and an IKE header. In the UDP header, there is set a port number '500' for UDP, which is generally used for the key exchange message conforming to IP Sec/IKE. The IKE header includes a cookie having a particular value (type value). As for this particular value, for example, '100' is set in both the upper eight bytes and the lower eight bytes. In an ordinary message, the upper eight bytes are determined by a sender, while the lower eight bytes are determined by a responding side. Therefore, by reserving the above-mentioned particular value in key exchange proxy server 2, the message can be distinguished. Here, it may also be possible to use a value other than '500' for UDP.

Now, referring to FIG. 9, when the key exchange message is received from subscriber terminal 5, message transmitter/receiver 11 in service control unit 1 forwards this received message to protocol controller 12.

On receipt of the message from message transmitter/receiver 11, protocol controller 12 performs a message analysis processing based on the service profile (refer to FIG. 3) (S12).

In this message analysis processing, shown in FIG. 10, protocol controller 12 first decides whether the reception packet (message) is a key exchange message transmitted from subscriber terminal 5(S21). This is performed based on whether the source address SA in the reception packet (that is, IP address of subscriber terminal 5) and the port number to be included in the key exchange message (that is, '500' for UDP) are existent in the IP Sec application conditions of the service profile and also based on the received packet content.

If the source address and the port number are existent in the IP Sec application condition ('Y' in S21), protocol controller 12 decides whether the reception message is any of a key exchange proxy request message, a key exchange message (IKE message), or a message (key transfer message) including key information (SA data) addressed to subscriber terminal 5, based on the reception packet content. For example, when the reception packet includes a UDP header or an IKE header, it can be decided that the reception packet is either the key exchange proxy request message or the key exchange message. Because the key transfer message includes the SA data, etc., it becomes possible to identify that the reception packet is the key transfer message.

If the reception packet is the key exchange proxy request message ('Y' in S21), protocol controller 12 transfers the reception packet (namely, the key exchange proxy request message) to key exchange proxy server 2 through message transmitter/receiver 11 (S26, and also S13 in FIG. 9).

If the reception packet is the key exchange message ('Y' in S22), protocol controller 12 transfers the reception packet (i.e. key exchange message) to either key exchange proxy server 2 or the opposite communication terminal 6 based on the source address or the destination address in the reception packet concerned, through message transmitter/receiver 11 (S26, and also S13 in FIG. 9). More specifically, when the source address in the reception packet is the opposite communication terminal 6, the reception packet is transferred to key exchange proxy server 2. When the source address in the reception packet is key exchange proxy server 2, the reception packet is transferred to the opposite communication terminal 6.

Further, when the reception packet is a message including the key information (SA) ('Y' in S23), protocol controller 12 transfers the reception packet to subscriber terminal 5 through message transmitter/receiver 11 (S25, and also S13 in FIG. 9).

If the reception packet is none of the key exchange proxy request message, the key exchange message, and the message including key information addressed to the subscriber ('N' in S21–S23), protocol controller 12 transfers the reception packet to routers, terminals, or the like, according to the ordinary routing processing (S24, and also S13 in FIG. 9).

Thus, the key exchange proxy request message transmitted from subscriber terminal 5 to service control unit 1 is transferred to service control unit 1 to key exchange proxy server 2.

Figure 12B:
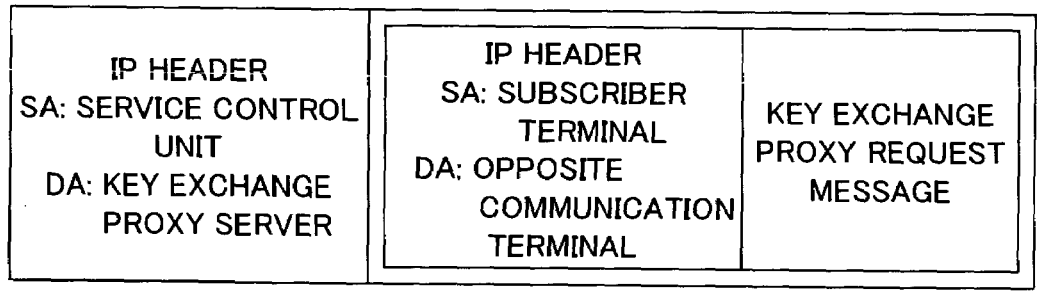
FIG. 12B shows a structure of a key exchange proxy request message transmitted from a service control unit to a key exchange proxy server.

FIG. 12B shows a structure of the key exchange proxy request message transferred from service control unit 1 to key exchange proxy server 2. Either protocol controller 12 or message transmitter/receiver 11 in service control unit 1 encapsulates the key exchange proxy request message transmitted from subscriber terminal 5, and packs the encapsulated message into the data part of the new IP packet.

In the IP header of this new IP packet, the IP address of service control unit 1 is stored as the source address, and the IP address of key exchange proxy server 2 is stored as the destination address.

In consequence, referring to FIG. 11, when message transmitter/receiver 21 in key exchange proxy server 2 receives the key exchange proxy request message shown in FIG. 12B (S31), message transmitter/receiver 21 supplies the reception message to protocol controller 22.

Protocol controller 22 then analyzes the reception message (S32). When the reception message is determined as a key exchange proxy request message, protocol controller 22 identifies the opposite communication party (in this case, the opposite communication terminal 6) based on the destination address DA in the key exchange proxy request message (refer to FIG. 12B) which has been encapsulated in the data part. Protocol controller 22 then performs the key exchange process between protocol controller 22 and the opposite communication terminal 6 having been identified as the opposite communication party (S33). In this key exchange process, protocol controller 22 requests key generator 23 to generate a key in case of necessary. In response to this request, key generator 23 generates the key.

In the key exchange process, protocol controller 22 generates a key exchange message (IKE message) to be transmitted to the opposite communication terminal 6 (S34). FIG. 13D shows a structure of the key exchange message generated in protocol controller 22 of key exchange proxy server 2.

Key exchange proxy server 2 performs key exchange processing as proxy for subscriber terminal 5. In the data part of the key exchange message generated by key exchange proxy server 2, key exchange message (IKE message) to be exchanged between subscriber terminal 5 and the opposite communication terminal 6 is encapsulated. Namely, the source address SA of the key exchange message included in the data part is the IP address of subscriber terminal 5, and the destination address DA of the key exchange message is the IP address of the opposite communication terminal 6. Further, in the IP header, there are included the IP address of key exchange proxy server 2 as the source address, and the IP address of service control unit 1 as the destination address. Additionally, the key exchange message having been encapsulated in the data part of the key exchange message shown in FIG. 13D has the same structure 16 as the key exchange message (key exchange proxy request message) shown in FIG. 12A.

Referring back to FIG. 11, the key exchange message shown in FIG. 13D is forwarded from protocol controller 22 to message transmitter/receiver 21, and then transmitted from message transmitter/receiver 21 to service control unit 1 (S35).

Referring to FIG. 9 and FIG. 10, the key exchange message (FIG. 13D) transmitted from key exchange proxy server 2 to service control unit 1 is transferred to the opposite communication terminal 6 according to the aforementioned processing steps S22 and S26 in service control unit 1 shown in FIG. 10. At this time, the key exchange message transmitted from key exchange proxy server 2 to service control unit 1 is decapsulated, and the key exchange message having been encapsulated in the data part is extracted. FIG. 13A shows the message structure extracted from the data part.

This extracted message is then transmitted from service control unit 1 to the opposite communication terminal 6, based on the destination address DA (that is, the IP address of the opposite communication terminal 6) included in the message.

On receipt of the key exchange message shown in FIG. 13A, the opposite communication terminal 6 performs the key exchange process conforming to IP Sec/IKE, similar to the process performed in key exchange proxy server 2. Here, the key exchange message received by the opposite communication terminal 6 is the message shown in FIG. 13A. Therefore, the opposite communication terminal 6 recognizes that the key exchange message has been transmitted from subscriber terminal 5, not from key exchange proxy server 2, and decides that the key exchange is being performed between the opposite communication terminal 6 and subscriber terminal 5.

Accordingly, in the key exchange process, the key exchange message transmitted by the opposite communication terminal 6 includes the IP address of the opposite communication terminal 6 as the source address SA, and the IP address of subscriber terminal 5 as the destination address DA.

As described earlier, because subscriber terminal 5 is connected wirelessly to service control unit 1, any message addressed to subscriber terminal 5 passes through service control unit 1. Accordingly, the key exchange message (FIG. 13B) transmitted to subscriber terminal 5 from the opposite communication terminal 6 is received by service control unit 1.

Through the processing in the aforementioned steps S22 and S26 shown in FIG. 10, service control unit 1 transfers the key exchange message transmitted from the opposite communication terminal 6 destined for subscriber terminal 5 to the key exchange proxy server. 2. At this time, this key exchange message is encapsulated as shown in FIG. 13C. Namely, the key exchange message transmitted from the opposite communication terminal 6 is encapsulated in the data part, the IP address of service control unit 1 is set as the source address SA in the IP header, and the IP address of key exchange proxy server 2 is set as the destination address DA.

Referring back to FIG. 11, the key exchange message shown in FIG. 13C is received by key exchange proxy server 2 (S31). After the message is analyzed (S32), the message is processed according to the key exchange process (S33).

Through the processing having been described above, the key (encryption key) is determined between key exchange proxy server 2 and the opposite communication terminal 6. In FIG. 7, such transmission/reception of the key exchange message performed between key exchange proxy server 2 and the opposite communication terminal 6 is shown by an arrow with symbol (2).

Figure 14A:
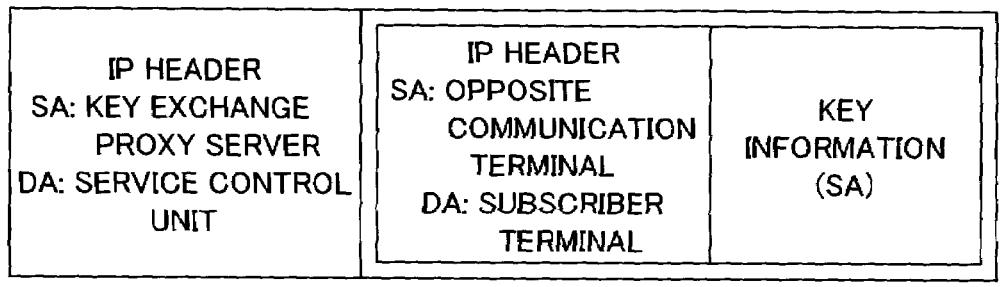
FIG. 14A shows a structure of a key transfer message transmitted from a key exchange proxy server to a service control unit.

When the key is determined, protocol controller 22 in key exchange proxy server 2 transmits the determined key to service control unit 1 using a key transfer message (S34, S35). FIG. 14A shows the structure of the key transfer message transmitted from key exchange proxy server 2 to service control unit 1.

In the IP header of this key transfer message, there are included the IP address of key exchange proxy server 2 as the source address, and the IP address of service control unit 1 as the destination address. In the data part, a key message including key information (SA data) is encapsulated.

Despite that the key exchange is performed by key exchange proxy server 2 as proxy for subscriber terminal 5, this key exchange is regarded as having been performed between subscriber terminal 5 and the opposite communication terminal 6. Therefore, in the IP header of the encapsulated key message, there are included the IP address of the opposite communication terminal 6 as the source address SA, and the IP address of subscriber terminal 5 as the destination address DA.

In the data part of the key message, the key information (that is, the SA data shown in FIG. 5B) is included.

Figure 14B:
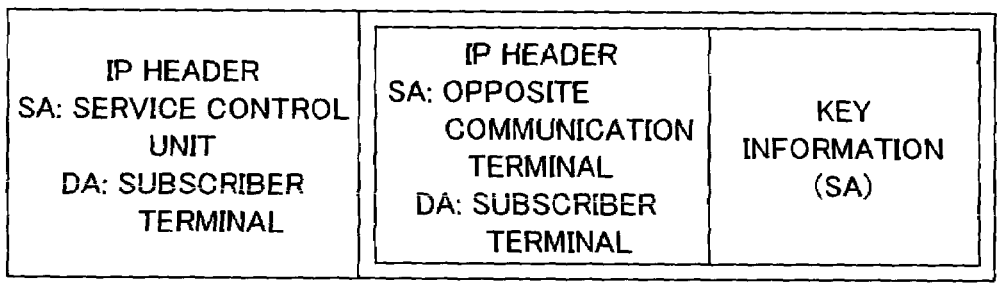
FIG. 14B shows a structure of a key transfer message transmitted from a service control unit to a subscriber terminal.

When the key transfer message is transmitted from key exchange proxy server 2 to service control unit 1, service control unit 1 transmits the key transfer message to subscriber terminal 5 through the aforementioned processing steps S23 and S25 shown in FIG. 10. FIG. 14B shows the structure of the key transfer message transmitted from service control unit 1 to subscriber terminal 5.

This key transfer message has a substantially identical structure with the aforementioned structure shown in FIG. 14A, excluding the source address SA and the destination address DA in the IP header. More specifically, the IP address of service control unit 1 is set as the source address SA, and the IP address of subscriber terminal 5 is set as the destination address DA.

A flow of the key transfer message transmitted from key exchange proxy server 2 to subscriber terminal 5 through service control unit 1 is shown by an arrow with symbol (3) in FIG. 7.

Referring back to FIG. 8, on receipt of the key transfer message from service control unit 1 (S5), message transmitter/receiver 52 in subscriber terminal 5 decapsulates the message and supplies the key message included in the data part to protocol controller 54.

Protocol controller 54 then extracts the key information (SA) included in the key message, and supplies the SA data to encryption process manager 55 (S6). Encryption process manager 55 adds the SA data received from protocol controller 54 to the SAD (S7).

Thereafter, subscriber terminal 5 encrypts data according to the encryption protocol using the key included in the SA data, and transmits the encrypted data to the opposite communication terminal 6. FIG. 15 shows a flow of packet transmission/reception processing in subscriber terminal 5 after the key is determined.

When application processor 51 in subscriber terminal 5 supplies to message transmitter/receiver 52 a packet transmission request addressed to the opposite communication terminal 6, message transmitter/receiver 52 detects the packet transmission (S41), and issues an inquiry to encryption process manager 55 whether the packet is to be encrypted, and whether the key is existent. Encryption process manager 55 decides whether the encryption is necessary, and whether the key is existent, using the SPD and the SAD (refer to FIG. 5A and FIG. 5B) (S42). The above processing is identical with the aforementioned steps S1 and S2 (shown in FIG. 8).

By way of example, the description hereafter is based on the case that the encryption is necessary and the key is existent. In this case, encryption process manager 55 selects an SA data having an IP address and a port number respectively coincident with the IP address and the port number in the SPD (S43), and instructs encryption/decryption section 53 to perform encryption processing based on the selected SA data.

On receipt of this instruction, encryption/decryption section 53 encrypts a packet by use of the key and the encryption protocol stored in the selected SA data (S44). Also, encryption/decryption section 53 stores the SPI included in the selected SA data into a predetermined field of the encrypted packet.

This encrypted packet is supplied to message transmitter/receiver 52, and then transmitted from message transmitter/receiver 52 to service control unit 1 (S45). Service control unit 1 transfers this packet based on the ordinary routing processing shown as step S24 in FIG. 10.

Thus, this packet is transmitted from service control unit 1 to the opposite communication terminal 6 through router 4. This packet transmission is shown by an arrow with symbol (4) in FIG. 7.

On receipt of the encrypted packet, the opposite communication terminal 6 identifies the key and the encryption protocol based on the SPI included in the packet and the SAD retained in the opposite communication terminal 6, and decrypts the packet according to the identified key and the encryption protocol.

Meanwhile, when the encrypted packet is transmitted from the opposite communication terminal 6 to subscriber terminal 5, this encrypted packet passes through router 4 and service control unit 1, and is received by message transmitter/receiver 52 in subscriber terminal 5 (S46). This packet transmission is also shown by an arrow with symbol (4) in FIG. 7.

Message transmitter/receiver 52 forwards the received packet to encryption/decryption section 53. Encryption/decryption section 53 then supplies the SPI included in the packet to encryption process manager 55. Encryption process manager 55 searches the SAD for an SA data coincident with the SPI supplied from encryption/decryption section 53, and extracts the search result (S47). Encryption process manager 55 then supplies to encryption/decryption section 53 the key and the encryption protocol (decryption protocol) in the extracted SA data.

Encryption/decryption section 53 decrypts the packet according to the key and the encryption protocol supplied from encryption process manager 55 (S48).

Thus, encryption communication is performed between subscriber terminal 5 and the opposite communication terminal 6.

Next, the processing in case that a key exchange request is transmitted from the opposite communication terminal 6 to subscriber terminal 5 conforming to IP Sec/IKE will be described below.

Figure 16:
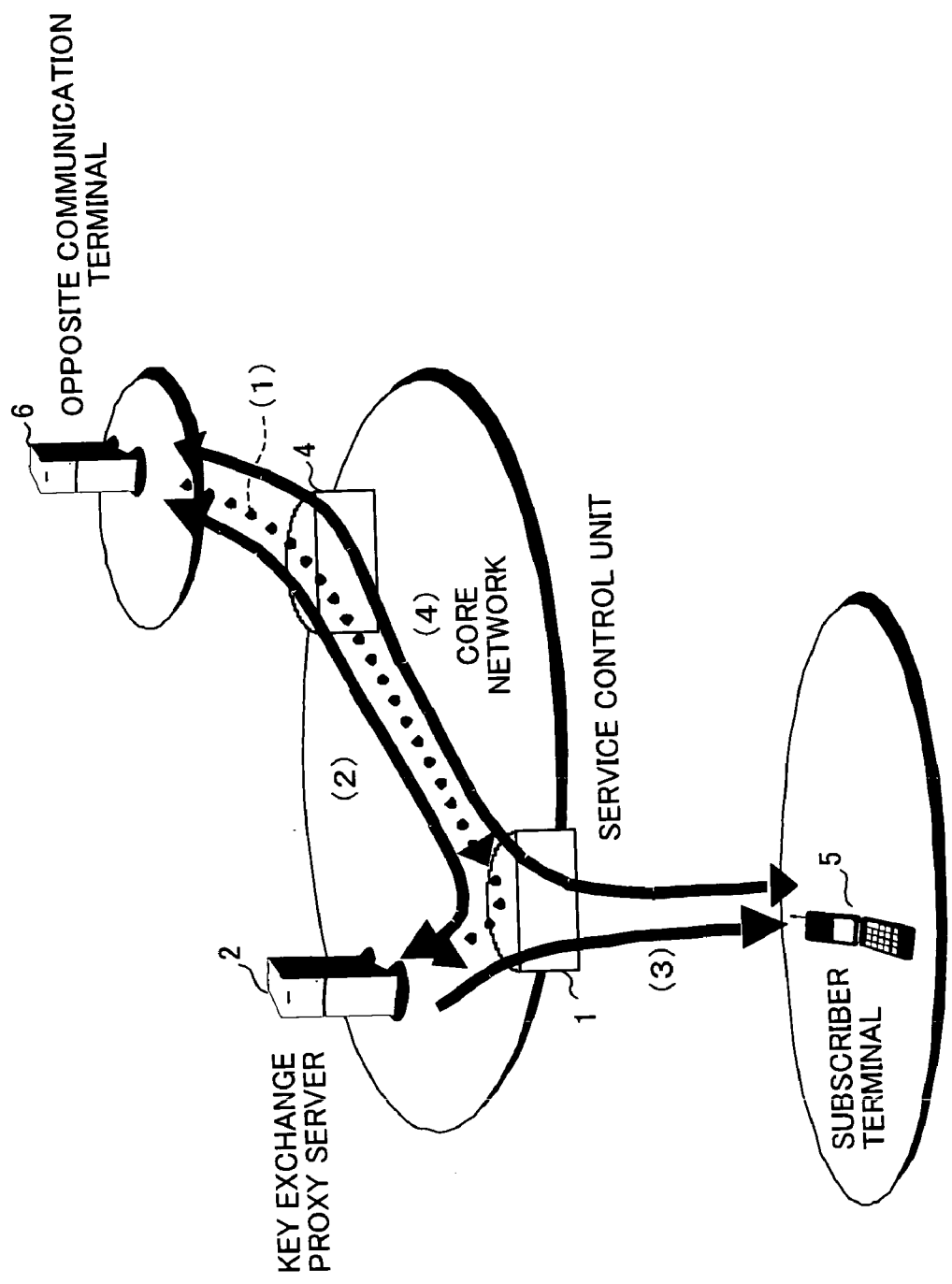
FIG. 16 shows total message flow from the transmission of a key exchange message issued by a terminal on the opposite party to the encryption communication between the terminal on the opposite party and a subscriber terminal.

FIG. 16 shows a total message flow from the transmission of a key exchange message by the opposite communication terminal 6 to the encryption communication between the opposite communication terminal 6 and subscriber terminal 5.

In the opposite communication terminal 6, similar to subscriber terminal 5, it is checked whether encryption of a packet addressed to subscriber terminal 5 is necessary, and whether the key is existent as well, based on the SPD and the SAD. When the encryption is decided necessary but no SA data specifying the key (and also specifying the encryption protocol) is existent, the opposite communication terminal 6 transmits the aforementioned key exchange message shown in FIG. 13B to subscriber terminal 5.

This key exchange message includes the IP address of subscriber terminal 5 as the destination address DA, and therefore is received in service control unit 1. Service control unit 1 encapsulates the key exchange message, as shown in FIG. 13C, according to the steps S22 and S26 shown in FIG. 10. The encapsulated key exchange message is then transferred to key exchange proxy server 2. In FIG. 16, the above-mentioned flow of the key exchange message is shown by an arrow with symbol (1).

Thereafter, in a similar way to the processing described earlier, the key exchange messages are exchanged between key exchange proxy server 2 and the opposite communication terminal 6 according to the key exchange process, and thus the key is determined. This exchange of the key exchange messages is shown by an arrow with symbol (2) in FIG. 16.

On determination of the key between key exchange proxy server 2 and the opposite communication terminal 6, the determined key is transmitted from key exchange proxy server 2 to service control unit 1, as a key transfer message shown in FIG. 14A. The key is further transmitted from service control unit 1 to subscriber terminal 5, as the key transfer message shown in FIG. 14B. The flow of this key transfer message is shown by an arrow with symbol (3) in FIG. 16.

On receipt of the key transfer message, subscriber terminal 5 adds the SA data included in the key transfer message to the SAD. Thereafter, subscriber terminal 5 decrypts the encrypted packet having been transmitted from the opposite communication terminal 6, based on the SAD.

Also, subscriber terminal 5 encrypts a packet addressed to the opposite communication terminal 6 based on the SAD, and transmits the encrypted packet. This transmission/reception of the encryption packets between the opposite communication terminal 6 and subscriber terminal 5 is shown by an arrow with symbol (4) in FIG. 16.

As can be understood from the above description, according to the embodiment of the present invention, key exchange proxy server 2 performs the key exchange processing conforming to IP Sec/IKE between key exchange proxy server 2, as proxy for subscriber terminal 5, and the opposite communication terminal 6. Therefore, it becomes unnecessary for subscriber terminal 5 to perform the key exchange processing, enabling reduction of the processing needed in subscriber terminal 5. Also, it becomes unnecessary for subscriber terminal 5 to retain a program for the key exchange processing (key exchange server function), enabling reduction of memory capacity needed in subscriber terminal 5. As a result, it becomes possible to obtain a miniaturized and light terminal device with reduced device cost. In addition, as no power consumption caused by the execution of the key exchange server function is required, power saving of subscriber terminal 5 can be attained.

Moreover, according to the embodiment of the present invention, service control unit 1 recognizes the location (IP address) of key exchange proxy server 2, and decides whether message transfer to key exchange proxy server 2 is required based on the service profile. Accordingly, it becomes unnecessary for both subscriber terminal 5 and the opposite communication terminal 6 to recognize the location of key exchange proxy server 2. The key exchange can be performed without this knowledge, and the consecutive encryption communication can be realized as well.

Additionally, similar to subscriber terminal 5, the opposite communication terminal 6 may be a portable terminal device having no key exchange server. In such a case, router 4 accessed by the opposite communication terminal 6 functions as a service control unit, and a key exchange proxy server locating nearest to the service control unit performs the key exchange processing as proxy for the opposite communication terminal 6. The key exchange processing is performed between key exchange proxy server 2 of subscriber terminal 5 and the key exchange proxy server of the opposite communication terminal 6. The determined key is transmitted from the respective key exchange proxy servers to subscriber terminal 5 and the opposite communication terminal 6.

Also, when the key exchange is performed by the key exchange proxy server as proxy for the opposite communication terminal 6, it may also be possible that this key exchange proxy server is an identical server with the key exchange proxy server performing the key exchange as proxy for subscriber terminal 5. It may also be possible that the service control unit transferring messages of the opposite communication terminal 6 is identical with the service control unit 1.

As an operator of core network 7, there is included a mobile virtual network operator (MVNO) which provides services to the users by the use of a network (a portion of network) leased from a large-scale network operator.

To summarize, the following effects can be obtained according to the present invention. Terminal units can obtain a key necessary for encryption communication without performing the key exchange processing and the processing necessary for determining the key. This enables reduction of the load in the terminal units. It is possible to perform the key exchange processing by a key exchange proxy unit (key exchange proxy server) in a network system, irrespective of the key exchange processing being requested from either one terminal unit or the other terminal unit for communication with the above-mentioned terminal unit.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A key exchange proxy network system performing, as proxy, a key exchange processing to be performed between a first terminal unit and a second terminal unit for encryption communication therebetween, said key exchange proxy network system comprising:
   a first service control unit accessed by the first terminal unit, and a first key exchange proxy unit performing the key exchange processing as proxy for the first terminal unit;
   wherein the first service control unit comprises:
      a first message reception section receiving a message from the first terminal unit, or the second terminal unit, or the first key exchange proxy unit;
      a first protocol control section which retains a first data for deciding whether the message received by the first message reception section is a key exchange message or a message including a key, decides whether the reception message is the key exchange message or the message including the key based on said first data, determines the first key exchange proxy unit as transfer destination when the reception message is the key exchange message received from either the first terminal unit or the second terminal unit, determines the second terminal unit as transfer destination when the reception message is the key exchange message received from the first key exchange proxy unit, and determines the first terminal unit as transfer destination when the reception message is the message including the key; and
      a first message transmission section transmitting the message received by the first message reception section to the transfer destination determined by the first protocol control section,
   and the first key exchange proxy unit comprises:
      a second message reception section receiving the message from the first service control unit;
      a second protocol control section which exchanges the key exchange message with the second terminal unit, and determines the key, when the message received by the second message reception section is the key exchange message; and
      a second message transmission section transmitting the key determined by the second protocol control section to the first service control unit as message including the key.

2. The key exchange proxy network system according to claim 1,
   wherein, triggered by reception of the key exchange message from the first terminal unit, the second protocol control section determines the key with the second terminal unit.

3. The key exchange proxy network system according to any one of claim 2, further comprising:
   a second service control unit accessed by the second terminal unit, and a second key exchange proxy unit performing the key exchange processing as proxy for the second terminal unit,
   wherein the second service control unit comprises:
      a third message reception section receiving a message from the first terminal unit, or the second terminal unit, or the second key exchange proxy unit;
      a third protocol control section which retains a second data for deciding whether the message received by the third message reception section is a key exchange message or a message including a key, decides whether the reception message is the key exchange message or the message including the key based on the second data, determines the second key exchange proxy unit as transfer destination when the reception message is the key exchange message received from either the first terminal unit or the second terminal unit, determines the first terminal unit as transfer destination when the reception message is the key exchange message received from the second key exchange proxy unit, and determines the second terminal unit as transfer destination when the reception message is the message including the key; and
      a third message transmission section transmitting the message received by the third message reception section to the transfer destination determined by the third protocol control section,
   and the second key exchange proxy unit comprises:
      a fourth message reception section receiving the message from the second service control unit;
      a fourth protocol control section which exchanges the key exchange message with the first key exchange proxy unit, and determines the key, when the message received by the fourth message reception section is the key exchange message; and a fourth message transmission section transmitting the key determined by the fourth protocol control section to the second service control unit as message including the key.

4. The key exchange proxy network system according to claim 3,
wherein the first service control unit and the second service control unit are comprised of an identical unit.

5. The key exchange proxy network system according to claim 4,
wherein the first key exchange proxy unit and the second key exchange proxy unit are comprised of an identical unit.

6. The key exchange proxy network system according to claim 3,
wherein the first key exchange proxy unit and the second key exchange proxy unit are comprised of an identical unit.

7. The key exchange proxy network system according to claim 1,
wherein, triggered by reception of the key exchange message from the second terminal unit, the second protocol control section determines the key with the second terminal unit.

8. The key exchange proxy network system according to any one of claim 7, further comprising:
a second service control unit accessed by the second terminal unit, and a second key exchange proxy unit performing the key exchange processing as proxy for the second terminal unit,
wherein the second service control unit comprises:
a third message reception section receiving a message from the first terminal unit, or the second terminal unit, or the second key exchange proxy unit;
a third protocol control section which retains a second data for deciding whether the message received by the third message reception section is a key exchange message or a message including a key, decides whether the reception message is the key exchange message or the message including the key based on the second data, determines the second key exchange proxy unit as transfer destination when the reception message is the key exchange message received from either the first terminal unit or the second terminal unit, determines the first terminal unit as transfer destination when the reception message is the key exchange message received from the second key exchange proxy unit, and determines the second terminal unit as transfer destination when the reception message is the message including the key; and
a third message transmission section transmitting the message received by the third message reception section to the transfer destination determined by the third protocol control section,
and the second key exchange proxy unit comprises:
a fourth message reception section receiving the message from the second service control unit;
a fourth protocol control section which exchanges the key exchange message with the first key exchange proxy unit, and determines the key, when the message received by the fourth message reception section is the key exchange message; and a fourth message transmission section transmitting the key determined by the fourth protocol control section to the second service control unit as message including the key.

9. The key exchange proxy network system according to claim 8,
wherein the first service control unit and the second service control unit are comprised of an identical unit.

10. The key exchange proxy network system according to claim 9,
wherein the first key exchange proxy unit and the second key exchange proxy unit are comprised of an identical unit.

11. The key exchange proxy network system according to any one of claim 1, further comprising:
a second service control unit accessed by the second terminal unit, and a second key exchange proxy unit performing the key exchange processing as proxy for the second terminal unit,
wherein the second service control unit comprises:
a third message reception section receiving a message from the first terminal unit, or the second terminal unit, or the second key exchange proxy unit;
a third protocol control section which retains a second data for deciding whether the message received by the third message reception section is a key exchange message or a message including a key, decides whether the reception message is the key exchange message or the message including the key based on the second data, determines the second key exchange proxy unit as transfer destination when the reception message is the key exchange message received from either the first terminal unit or the second terminal unit, determines the first terminal unit as transfer destination when the reception message is the key exchange message received from the second key exchange proxy unit, and determines the second terminal unit as transfer destination when the reception message is the message including the key; and
a third message transmission section transmitting the message received by the third message reception section to the transfer destination determined by the third protocol control section,
and the second key exchange proxy unit comprises:
a fourth message reception section receiving the message from the second service control unit;
a fourth protocol control section which exchanges the key exchange message with the first key exchange proxy unit, and determines the key, when the message received by the fourth message reception section is the key exchange message; and
a fourth message transmission section transmitting the key determined by the fourth protocol control section to the second service control unit as message including the key.

12. The key exchange proxy network system according to claim 11,
wherein the first service control unit and the second service control unit are comprised of an identical unit.

13. The key exchange proxy network system according to claim 12,
wherein the first key exchange proxy unit and the second key exchange proxy unit are comprised of an identical unit.

14. The key exchange proxy network system according to claim 11,
wherein the first key exchange proxy unit and the second key exchange proxy unit are comprised of an identical unit.

15. A service control unit accessed by a terminal unit, transferring a message from any one of said terminal unit, and a key exchange proxy unit performing a key exchange processing as proxy for said terminal unit, and an opposite terminal unit for encryption communication with said terminal unit, said service control unit comprising:
a message reception section receiving a message from the terminal unit, or the key exchange proxy unit, or the opposite terminal unit;
a protocol control section which retains a data for deciding whether the message received by the message reception section is a key exchange message or a message including a key, decides whether the reception message is the key exchange message or the message including the key based on said data, determines the key exchange proxy unit as transfer destination when the reception message is the key exchange message received from either the terminal unit or the opposite terminal unit, determines the opposite terminal unit as transfer destination when the reception message is the key exchange message received from the key exchange proxy unit, and determines the terminal unit as transfer destination when the reception message is the message including the key; and
a message transmission section transmitting the reception message to the transfer address determined by the protocol control section.

16. The service control unit according to claim 15,
wherein the data is a service profile provided on a per terminal unit basis, including an address and a port number designating an application, and
the protocol control section compares either a destination address or a source address included in the message received by the message reception section with the address included in the service profile, and compares the port number included in the reception message with the port number included in the service profile, and thereby determines whether the reception message is the key exchange message or the message including the key.

17. A key exchange proxy unit performing a key exchange processing with an opposite terminal unit as proxy for a terminal unit to perform encryption communication to the opposite terminal unit, said key exchange proxy unit comprising:
a message reception section receiving the message from service control unit which is accessed by the terminal unit, and transfers a message received from either the terminal unit or the opposite terminal unit;
a protocol control section which exchanges a key exchange messages with the opposite terminal unit, and determines the key, when the message received by the message reception section is the key exchange message; and
a message transmission section which transmits the key determined by the protocol control section to the service control unit as the message including the key.

18. The key exchange proxy unit according to claim 17, further comprising:
a key generation section generating the key.

19. The key exchange proxy unit according to claim 18,
wherein, triggered by reception of the key exchange message from the terminal unit, the protocol control section determines the key with the opposite terminal unit.

20. The key exchange proxy unit according to claim 18,
wherein, triggered by reception of the key exchange message from the opposite terminal unit, the protocol control section determines the key with the opposite terminal unit.

21. The key exchange proxy unit according to claim 17,
wherein, triggered by reception of the key exchange message from the terminal unit, the protocol control section determines the key with the opposite terminal unit.

22. The key exchange proxy unit according to claim 17,
wherein, triggered by reception of the key exchange message from the opposite terminal unit, the protocol control section determines the key with the opposite terminal unit.

23. A terminal unit accessing a service control unit in a communication network and performing encryption communication with an opposite terminal unit, said terminal unit comprising:
an encryption process management section which retains a first data specifying a communication condition requiring encryption and a second data including a key for use in the encryption, decides whether encryption is required for the communication with the opposite terminal unit based on the first data, and decides whether the key required for the encryption is existent in the second data;
a message transmission section which transmits a key exchange message to the opposite terminal unit through the service control unit, when the encryption process management section decides that the encryption is required and that the key required for the encryption is not existent; and
a message reception section which receives the message including the key determined between a key exchange proxy unit in the communication network and the opposite terminal unit from the service control unit.

24. The terminal unit according to claim 23,
wherein the first data includes an address of the opposite terminal unit for which encryption communication is required, and a port number designating an application, and
the encryption process management section compares a destination address of the message to be transmitted to the opposite terminal unit with the address in the first data, compares the port number included in the transmission message with the port number included in the first data, and thereby decides whether the encryption is required in the communication with the opposite terminal unit.

25. The terminal unit according to claim 24,
wherein the second data includes an address, a port number, an encryption protocol and a key for use in the encryption, and
the encryption process management section compares the address in the first data with the address in the second data, compares the port number in the first data with the port number in the second data, and thereby decides whether the key required for the encryption is existent in the second data.

26. The terminal unit according to claim 23,
wherein the second data includes an address, a port number, an encryption protocol and a key for use in the encryption, and
the encryption process management section compares the address in the first data with the address in the second data, compares the port number in the first data with the port number in the second data, and thereby decides whether the key required for the encryption is existent in the second data.

27. A key exchange proxy method for a key exchange proxy network system having a key exchange proxy unit performing a key exchange processing between a first terminal unit and a second terminal unit as proxy for the first terminal unit for encryption communication between the terminal units, said key exchange proxy method comprising:
in the service control unit, transferring a key exchange message received from either the first terminal unit or the second terminal unit to the key exchange proxy unit;
in the key exchange proxy unit, generating the key exchange message to be exchanged between the first terminal unit and the second terminal unit, and transmitting the generated key exchange message to the service control unit;
in the service control unit, transferring the key exchange message to the second terminal unit;
in the key exchange proxy unit, transmitting to the service control unit a message including the key determined by exchanging the key exchange messages; and
in the service control unit, transferring to the first terminal unit the message including the key received from the key exchange proxy unit.

28. A key exchange proxy network system performing, as proxy, a key exchange processing to be performed between a first terminal unit and a second terminal unit for encryption communication therebetween, said key exchange proxy network system comprising:
a service control unit accessed by the first terminal unit; and
a key exchange proxy unit performing the key exchange processing as proxy for the first terminal unit, wherein the service control unit transfers either a key exchange proxy request message received from the first terminal unit, or a key exchange message received from the second terminal unit, to the key exchange proxy unit based on a service profile provided for deciding a transfer destination of a reception message, transfers the key exchange message received from the key exchange proxy unit to the second terminal unit, and transfers a message including the key received from the key exchange proxy unit to the first terminal unit, and
the key exchange proxy unit exchanges the key exchange message between the key exchange proxy unit and the second terminal unit through the service control unit, and thereby determines the key, and transmits the message including the determined key to the first terminal unit through the service control unit.

29. The key exchange proxy network system according to claim 8,
wherein the first key exchange proxy unit and the second key exchange proxy unit are comprised of an identical unit.

* * * * *